R. P. ODELL, Jr.
Cultivator-Teeth.
No. 158,512.
Patented Jan. 5, 1875.
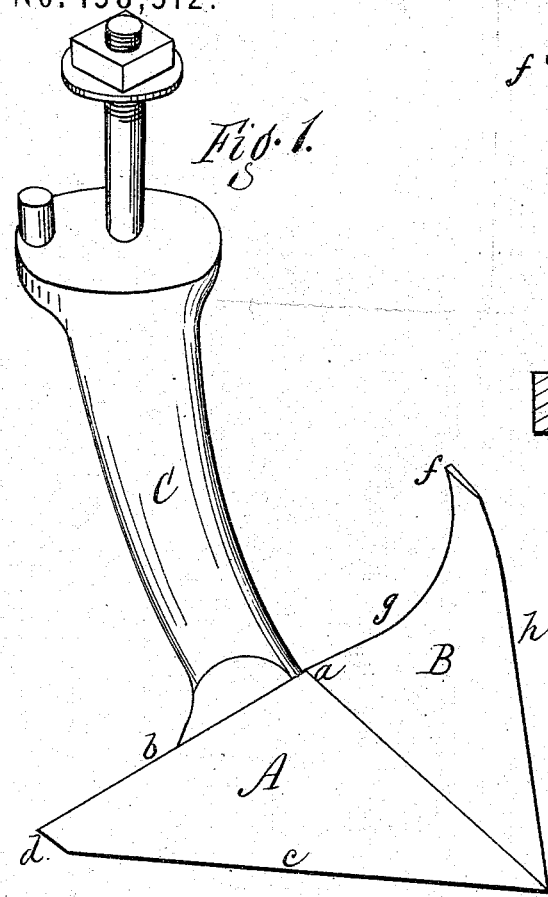
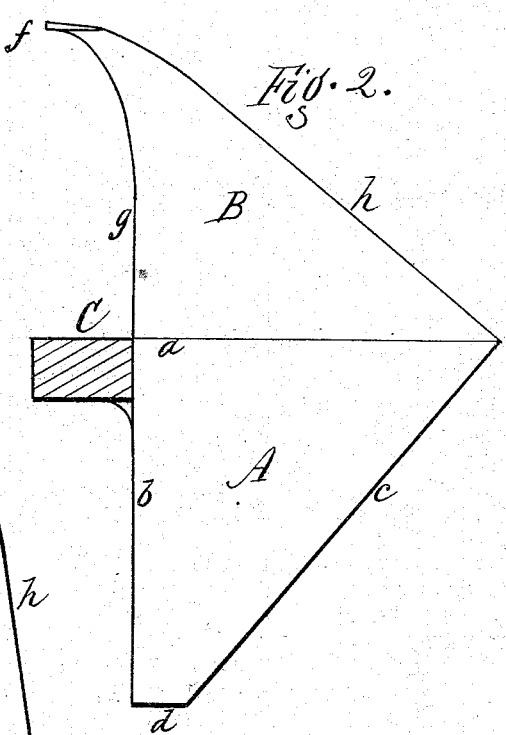
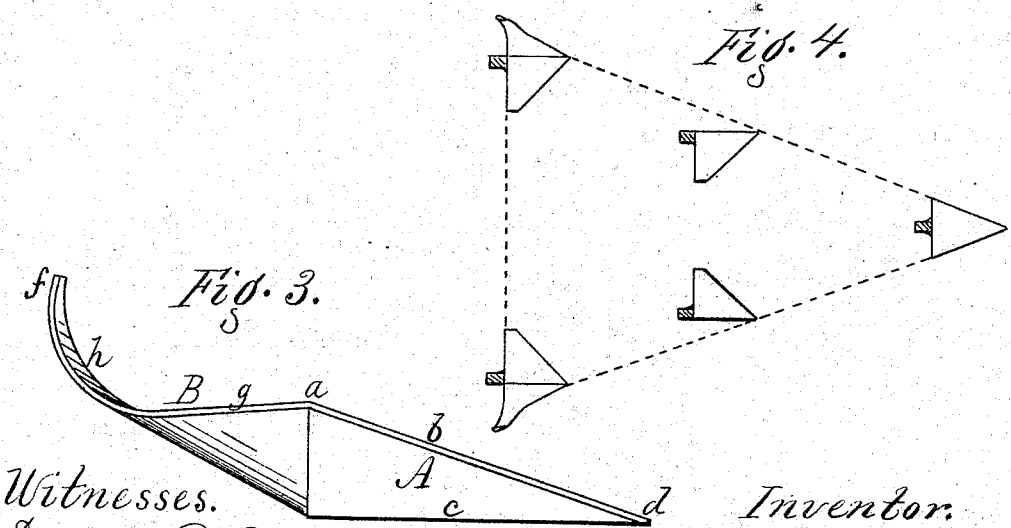
Witnesses.
Edwin B. Scott.
Louis Spahn.
Inventor.
Rodney P. Odell, jr.
pr R. F. Osgood,
Atty.

UNITED STATES PATENT OFFICE.

RODNEY P. ODELL, JR., OF PARMA CENTRE, ASSIGNOR OF ONE-HALF HIS RIGHT TO SIMEON K. ODELL, OF NORTH GREECE, N. Y.

IMPROVEMENT IN CULTIVATOR-TEETH.

Specification forming part of Letters Patent No. 158,512, dated January 5, 1875; application filed December 3, 1874.

*To all whom it may concern:*

Be it known that I, RODNEY P. ODELL, Jr., of Parma Centre, in the county of Monroe and State of New York, have invented a certain new and useful Improvement in Cultivator-Teeth; and I do hereby declare that the following is a full, clear, and exact description of the construction and operation of the same, reference being had to the accompanying drawings, in which—

Figure 1 is a perspective view of my improvement. Fig. 2 is a plan of the tooth. Fig. 3 is a rear elevation of the same. Fig. 4 is a diagram, showing the arrangement of the teeth when applied to a cultivator.

My improvement relates to cultivator-teeth cut from sheet-steel, and secured to standards attached to the cultivator-frame.

The invention consists in a peculiar formation of the tooth, as hereinafter described.

For convenience of description I indicate the wing or mold-board portion of the tooth by the letter A, and the land-side portion by the letter B, although the tooth is made in one piece from sheet-steel, and is riveted, bolted, or otherwise secured to the standard C. The wing or mold-board portion A is in the form of an equi-lateral triangle, with the three sides $a\ b\ c$, but having the outer rear corder $d$ clipped off half an inch (more or less) to stand parallel with $a$. The body of the wing portion is flat or plane, but is so mounted upon the supporting-foot of the standard C that the lines $a\ b$ stand at an angle of about twenty degrees from base to apex, while the edge $c$, which is the hypotenuse, rests flat upon the soil the whole length. The size may be varied to suit the necessities of use; but, for an ordinary cultivator, I prefer to make the sides $a\ b$ five and a half inches long, and to set the apex at the rear two inches high. The land-side portion B, which projects upon the opposite side of the standard, is carried back to a point, $f$, which is turned up in a regular curve to stand upright, as shown in Fig. 3. The projection laterally on the line $g$ is the same as on the corresponding line $b$ of the wing; but the point $f$ (corresponding with the size before given) stands two inches back or in the rear of the line $b$, and in the curving this point is made to stand about four and seven-eighths inches in height. The long side $h$ simply extends from heel to point.

In operation the cutting-edge $c$ of the wing rests level, and cuts lightly into the soil from end to end by a shearing cut, and the soil and weeds pass up smoothly over the inclined surface of the wing, and are discharged at the rear, leaving the weeds perfectly separated from the dirt.

The clip $d$ prevents too deep a cut at the rear, and also serves the purpose of preserving the form of the blade, since the wear is nearly equal on all parts of the cutting-edge $c$, and the said edge cannot shorten till the wear has reached the rear end of the square corner $d$. The land-side B assists the cut of the wing, and avoids the leaving of a square shoulder in the dirt next the plants, which would be left by the wing alone. It graduates the cut up to the line of the row of plants, leaving it thin and light at that point, so as not to disturb the roots. By this means the cut may be carried up close to the hills, and much labor of hoeing avoided, as the point $f$ runs so close to the plants as to crack and break the earth around the hills, thus thoroughly loosening the soil at all points. It also throws the dirt and weeds away from the plants, and gives a free discharge over the blade to the rear. In addition to the above the point $f$ projecting above the ground serves as a mark to the eye in guiding the cultivator, and enables the operator to run nearer the hills than he could otherwise do with safety with the whole tooth embedded.

The particular formation of the point $f$—being thrown back or in the rear of the upper edge of the tooth, and presenting only a narrow width—facilitates the escape of the soil over the land-side portion of the tooth. The soil concentrates there, and drops over easily, without clogging and without disturbing the plants, which would not be the case if the land-side were wide, or if it were in a straight line on the rear edge.

The teeth are connected with the cultivator, as shown in the diagram, Fig. 4, in which a double-winged tooth is used in front, two single-winged teeth in the middle, and two teeth, as I have above described, in the rear. The front and middle teeth are made similar to the wing portion A.

Having thus described my invention, what I claim as new, and desire to secure by Letters Patent, is—

A cultivator-tooth, consisting of the wing A and land-side B, formed in a single piece, the wing being made in the form of an equilateral triangle, with the square corner $d$, and the land-side provided with the upright curved point $f$ standing back from the rear of the tooth, as herein shown and described, and for the purpose specified.

In witness whereof I have hereunto signed my name in the presence of two subscribing witnesses.

R. P. ODELL, JR.

Witnesses:
 R. F. OSGOOD,
 EDWIN B. SCOTT.